FIG_3_

United States Patent Office 3,015,441
Patented Jan. 2, 1962

3,015,441
INDEXING SYSTEM FOR CALCULATORS
Edward F. Rent, Vestal, and Flavius M. Powell, Johnson City, N.Y., assignors to International Business Machines Corporation, New York, N.Y., a corporation of New York
Filed Sept. 4, 1957, Ser. No. 682,016
5 Claims. (Cl. 235—157)

This invention relates to calculators and more particularly to stored program calculators having an indexing system which is selectively operative to perform an arithmetic operation on a set of data.

It is one of the prime objects of the invention to provide a stored program calculator with auxiliary addressable accumulators and arithmetic sections which are capable of increasing the over-all operating speed of the calculator.

It is another object of the invention to provide a stored program calculator with an indexing system operative to reduce the number of program steps required to complete an arithmetic operation on an array of data.

It is yet another object of the invention to provide a stored program calculator with an indexing system which is operative to automatically modify either or both of the data and instruction addresses without destroying the original stored data and instruction address data.

It is still another object of the invention to provide a stored program calculator with an indexing system which is capable of automatically modifying the address of any instruction.

It is another object of the invention to provide a stored program calculator operating under the direction of a program step word with a plurality of addressable auxiliary accumulators carrying data therein which may be selectively added to or subtracted from the data and/or instruction addresses by a separate arithmetic section to automatically modify the actual addresses of the data or instruction portion of the word.

It is yet another object of the invention to provide a stored program calculator having main accumulators with addressable auxiliary accumulators which may be utilized in the arithmetic operation of the data.

It is another object of the invention to provide a stored program calculator with addressable indexing accumulators and an auxiliary arithmetic section for modifying instruction and data addresses which reduces the required storage space for program step words.

It is still another object of the invention to provide a stored program calculator having a main arithmetic section and a program control section with a plurality of addressable data storing indexing accumulators and an auxiliary arithmetic section.

It is another object of the invention to provide a stored program calculator with addressable indexing accumulators and an auxiliary arithmetic section which reduces the probability of error in the writing of a program routine.

It is yet another object of the invention to provide a stored program calculator with a main arithmetic section and a related program instruction section with addressable indexing accumulators and an auxiliary arithmetic section which with a single instruction provides data for the next arithmetic operation.

It is another object of the invention to provide a stored program calculator having a program step control for controlling an arithmetic operation with addressable indexing accumulators which may modify either or both the address of the data to be operated upon and the address of the next instruction.

Heretofore, when solving complex problems in standard type stored program calculators, each step performed in the solution of the problem requires a separate instruction. Thus, an instruction must be stored at some location and then interrogated to determine what the next step is to be including the location of the daa to be operated upon. The data is then located and is manipulated in accordance with the desired instruction or operation. After this, the next instruction or program step must be located and stored in the program storage register or the like. This must be repeated for each operation to be performed. From this it is readily apparent that a vast number of individual instructions must be written when solving some problems. In a large number of these problems, there are many operations involving repetitive steps, and the same number of operations are performed on arrays of data wherein only the numeric values are modified and not the operations. In solving problems wherein arithmetic is performed in loops, somewhat the same conditions exist.

In each of these conditions it sometimes requires many hundreds or even thousands of individual program steps to perform the desired arithmetic operation. In a relatively large percentage of these cases, the program steps are identical for each group of data worked upon. In addition, these many program step instructions may occupy a large percentage of the available storage capacity of the calculator which, of course, reduces the space available for the storage of data. This data storage reduction also requires more frequent inputs and outputs as the program routine advances the problem. Likewise, the manual writing of a vast number of instruction words increases the possibility of error. An estimate is that a programmer averages approximately one program error for each one hundred instructions written. Thus the fewer the number of instructions required to program a problem, the less the chance of error.

Another factor is that each individual instruction not only consumes time in the writing of the program, but likewise requires time to read in and out of the program storage section. This time, of course, is in effect non-productive.

This invention is directed to stored program calculators of the above type wherein it is intended to reduce the number of stored program steps required to solve certain problems by providing a set of basic instructions, which instructions are thereafter automatically modified to operate on different sets of data found at other storage locations without changing the original instructions or their storage location.

Thus in this manner, a relatively few number of instructions may be utilized to automatically operate upon a vast amount of data. The fewer instructions required makes it relatively easier to check for program errors, reduces the instruction storage space, and permits this saving to be utilized for data storage for still more calculations without transferring data. In addition, calculator time is saved because the arithmetic operations required for an automatic address change are handled by an auxiliary arithmetic section and it is not necessary to use the main arithmetic section.

In order to accomplish these results, addressable indexing accumulators and an auxiliary arithmetic section have been incorporated as part of the calculator. These indexing accumulators, designated as A4, A5 and A6, are capable of storing data therein which is immediately available for any specified use when desired.

In F. E. Hamilton et al application, Serial No. 544,520, filed November 2, 1955, now Patent No. 2,959,351 issued Nov. 8, 1960, there is disclosed a parallel by bit, serial by digit, stored program calculator having a fixed word length comprising ten data digit positions for storing data, plus a sign position. The disclosed invention is adapted to operate with a calculator of this type. The description appearing in the following specification will refer to the above Hamilton et al application for certain details which need not be disclosed in detail herein.

For the purposes of this description, a schematic illustration is provided of a stored program computer arranged to utilize the present invention. This computer includes a main adder and the main accumulators A1, A2 and A3 together with necessary controls and adjuncts for performing the usual arithmetic operations upon data supplied thereto. An operation register, program register and address register are provided for receiving and storing program step words, and govern the operation of the computer via an operation matrix and address selection circuits.

During an arithmetic operation, the data in the accumulators is directed through the adder in synchronism with timing pulses supplied from a data storage drum or the like in accordance with the operation specified in the operation register. During normal operation, all ten data digit positions are utilized for the data. The data stored in a selected one of the accumulators is directed through the adder along with that supplied from storage, and the result is stored in a selected one of the accumulators, dependent upon the previous instruction.

The program step or instruction word comprises eleven digit positions D10—D0. D4—D1 indicate the instruction address, D8—D5 indicate the data address and D10, D9 and D0, the operation code. Thus reading from left to right, XX XXXX XXXX X indicate two digits of the operation code (OP), D10—D9, the data address (D), D8—D5, the instruction address (I), D4—D1, and sign digit position, D0, respectively.

The main accumulators, and indexing accumulators are all addressable and may include data values for use in modifying data and instruction addresses or to store data.

In the disclosed embodiment, each of the three indexing accumulators utilized with the calculator is a ten-digit accumulator with an associated sign. They can be considered as additional accumulators, but their primary function is for address modification, or indexing. The contents of any one of the indexing accumulators may be used to automatically modify the data or the instruction address part of any instruction. The use of the disclosed indexing accumulators provides more flexibility and versatility than any comparable device in data processing machines in the commercial and scientific area. For example, these indexing accumulators permit operations such as reset add, reset subtract, add or subtract. It is also possible to test each indexing accumulator for a zero or nonzero, positive or negative state. Each indexing accumulator is addressable so that its contents and sign may be read into other addressable locations in the calculator, and vice versa.

Since many problems require the same operations to be performed repetitively, as when processing ordered arrays of data, a large amount of address arithmetic must be done to modify instructions so that they will operate upon the proper data. Indexing accumulators are devices that will automatically modify addresses and greatly facilitate the necessary address arithmetic.

The disclosed index accumulators may also be used as separate accumulators. As accumulators, they may be used for accumulating totals, holding group multipliers, or as high-speed storage devices. Programming is simplified, the number of instructions required is reduced, and therefore, programming errors are reduced. Because fewer instructions are executed, the problem solution time will be less. Also, the logic of a program using indexing accumulators is simpler than the logic for a corresponding nonindexed program. This, of course, eases the burden on the programmer and tends toward faster, more accurate programming.

Address modification is greatly simplified by the use of indexing accumulators with an associated arithmetic section. For example, it is often required that the D address of an instruction be modified to refer to a location which is not the same as the one originally written with the instruction. The standard method is to add a constant to the D address of the instruction. This method, of course, changes the original D address. The indexing accumulator method places the amount of change in the index accumulator. When the instruction is read from the drum into the program step register, the amount of change from the indexing accumulator is combined with the D address in the arithmetic section and then stored in the program register. The instruction is then executed, and the data selected is from the location specified by the changed D address. Thus, the original instruction on the drum retains its original D address but the effective address was determined by the combined value of the indexing accumulator and the instruction's D address. The I address of the instruction can be altered in a similar manner.

Since every instruction is not to be altered by the indexing system, a coding method is needed which will specify an instruction which is to be modified. Also, since three indexing accumulators are available, this coding method should specify which indexing accumulator to use. This coding method consists of utilizing certain of the various possible digits in the sign position of the OP code portion of the program word to indicate the operation as indexing or not indexing, the sign, and the address of the indexing accumulator, if one is to be employed.

The following table indicates the possible sign digit values and their corresponding functions.

| Sign value: | Function |
| --- | --- |
| 0 | Plus Operation, No Index. |
| 1 | Plus Operation, Index by A4. |
| 2 | Plus Operation, Index by A5. |
| 3 | Plus Operation, Index by A6. |
| 4 | Invalid Operation Sign. |
| 5 | Invalid Operation Sign. |
| 6 | Minus Operation, No Index. |
| 7 | Minus Operation, Index by A4. |
| 8 | Minus Operation, Index by A5. |
| 9 | Minus Operation, Index by A6. |

As an example of the manner in which the sign position digit of the instruction word controls the indexing operation, consider the following example. Assume that the instruction word is as follows:

27 3024 3245 1 The digits 27 represent two digits of the operation code, 3024 is the data address in storage, and 3245 is the storage location of the next instruction. The digit 1 is in the sign position of the instruction word, and as indicated above, indicates a plus operation, index by accumulator A4. Consider that accumulator A4 has the value 00 1024 0000-, stored therein. The incoming D address, 3024, is accordingly added algebraically in the auxiliary arithmetic section, to the contents of accumulator A4, so that the resulting indexed instruction now reads +27 2000 3245. Note that the operation code digits 27 remain unchanged as well as the next instruction or I address. The operation code digits are never changed by the indexing operation, but either the D address or the I address, or both, may be modified.

When in use as indexing accumulators, the accumulators A4, A5 and A6 utilize only the first eight digit positions, the first four of which are used for modifying the I address and the second four of which are used for modifying the D address. Also, under these conditions, no carry operations take place between the fourth and fifth digit positions, and any carry operations out of the eighth digit position are lost. When the index accumulators A4, A5 and A6 are not required for indexing operations, they may be employed as full 10 position accumulators, in the same manner as main accumulators A1, A2 and A3, for arithmetic operations on data words, since each accumulator is addressable and has provision for handling signs.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference characters refer to similar parts in each of the several views.

*Tubes and control switches*

In each of the drawings of the various control devices, the individual components or units making up that device are indicated merely as a box or block. The specific circuitry of such blocks will not be generally described as applied to various typical forms of tubes and diode circuits. A detailed description of typical diode coincident switches, diode mixes, inverters, single and double latches, along with necessary cathode followers, inverter followers, and power tubes, where required, and which would be applicable or necessary to apparatus to this type is shown and described in the above-mentioned F. E. Hamilton et al. application.

Figure 4A:
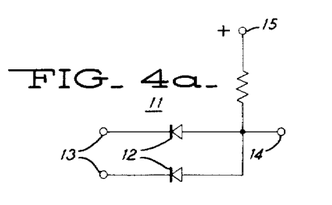
FIGS. 4a and 4b illustrate in diagrammatic form a typical logical diode AND circuit, or switch.
Figure 4B:
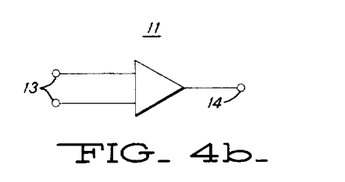

For the purpose of this description, a typical coincident switch 11, FIGS 4a and 4b, otherwise known as a logical AND circuit or diode switch, comprises a plurality of germanium crystal diodes or the like 12, each including an individual input terminal 13 normally biased negative so that the common terminal 14 is a negative potential with respect to ground. If coincident positive pulses are applied to all input terminals 13, the potential of the output terminal 14 is raised from the positive terminal 15. However, if only one of the input terminals is pulsed positively, the potential of the common output terminal 14 is not raised appreciably. Any suitable voltage responsive device may be controlled by the potential of the output terminal 14 to furnish a usable output voltage level whenever a coincidence of positive input pulses is detected. Throughout the drawings a diode switch 11 is indicated as shown in FIG. 4b.

Figure 5A:
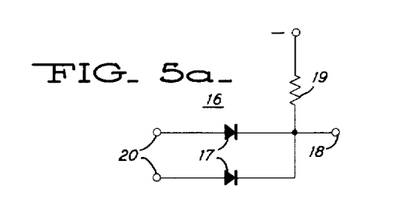
FIGS. 5a and 5b illustrate in diagrammatic form a typical logical diode OR circuit, or mix.
Figure 5B:
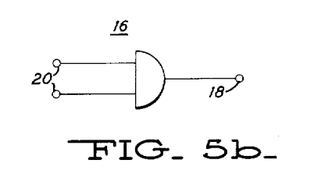

A typical mix, FIGS. 5a and 5b, otherwise known as a logical OR circuit or diode mix 16, comprises a plurality of germanium crystal diodes or the like 17. The diodes 17, employed in the mixers, are shaded and the direction reversed in the present drawings to distinguish them from the diodes 12 which are employed in the switches 11. As shown in FIG. 5b, an arc of a circle represents the diode mix 16 and is employed throughout in the drawings. Any suitable voltage responsive device is controlled by the potential of a common output terminal 18 of the diode mix, which terminal is connected by a suitable resistor 19 to a negative voltage source, not shown, to maintain a negative bias on any line extending from the output terminal 18. Each diode 17 is connected to an individual input terminal 20 which in turn is connected in the electrical circuit. If either one or all of the diode input terminals 20 are pulsed positively, the potential of the output terminal 18 is raised, which permits the tube associated therewith to conduct or operate in a predetermined manner.

Figure 2A:
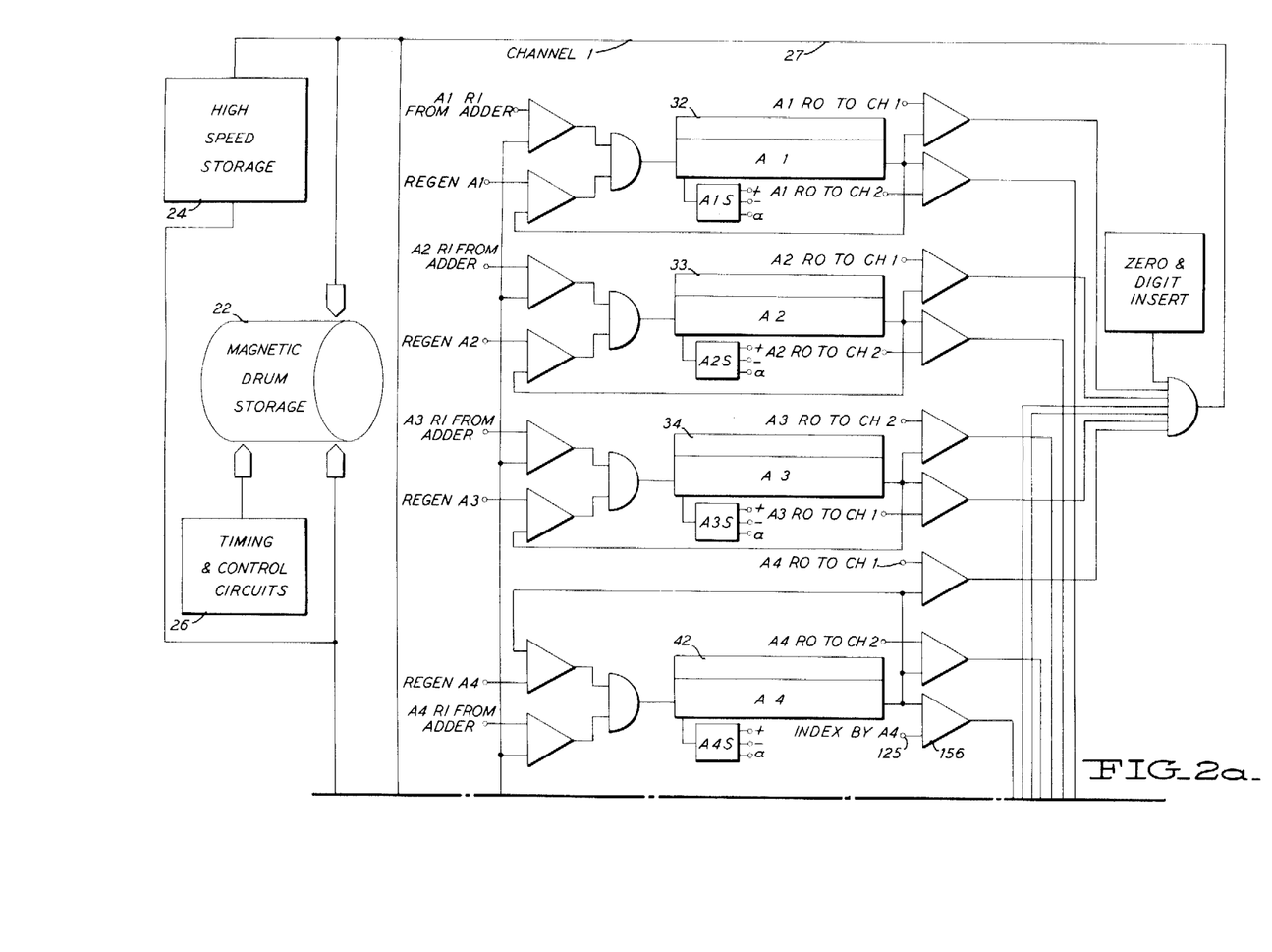
FIGS. 2a to 2c, inclusive, with FIG. 2a placed above FIG. 2b, and FIG. 2c placed to the left of FIG. 2b, represent a schematic wiring diagram of the computer shown in FIG. 1, but showing in some detail the various circuits required for the indexing system.
Figure 2B:
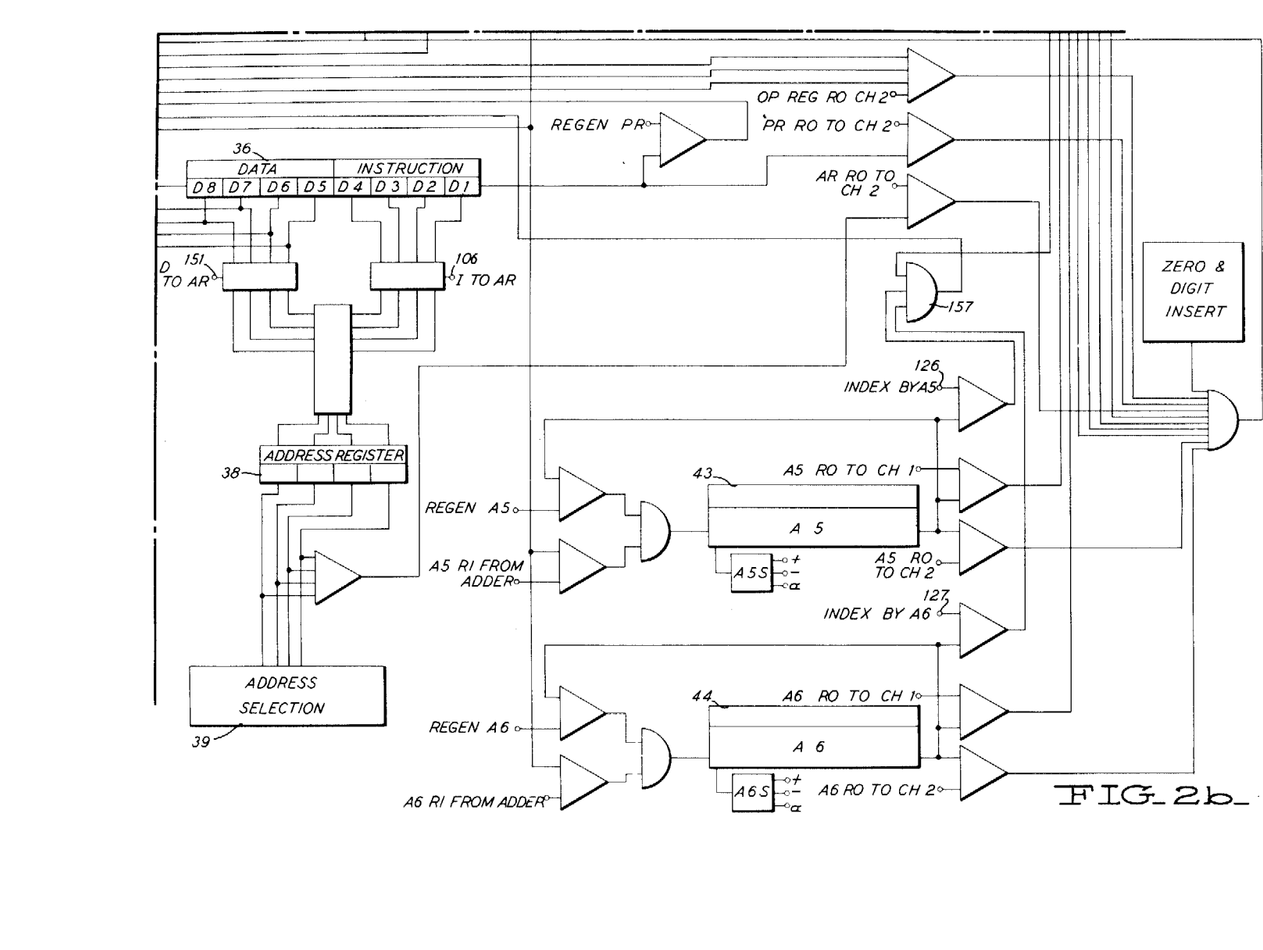
Figure 2C:
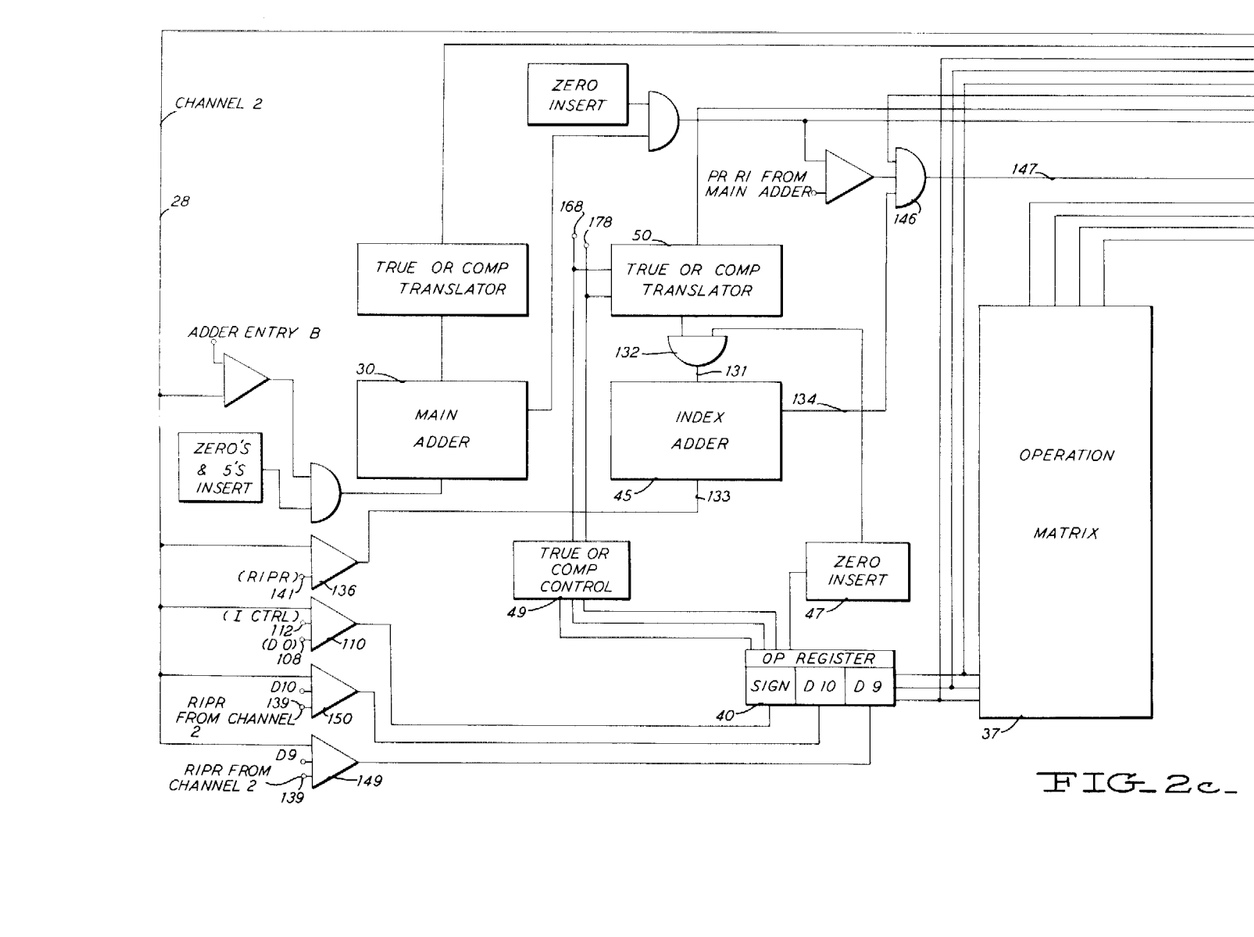

Referring to FIGS. 2a to 2c, inclusive, which represent a schematic wiring diagram of a calculator including an indexing system according to the invention, each of the component blocks or units comprising a particular circuit is labeled with a letter or combination of letters. The respective general or objective circuitry of most of the component blocks may be determined by identifying the letter-number block designation. Each particular letter combination in the component block, in addition to acting as a reference designation, also denotes the function of the component. The various combinations of inverters, double inverters and cathode followers which are connected in a particular manner are labeled latches. These latches may be of the single or double type and are fully described in the above F. E. Hamilton et al. application.

Hereinafter in the specification wherein a conductor or circuit terminal or the like is referred to as being positive or negative in potential, this does not necessarily mean that the point in question is positive or negative in an absolute sense but more positive or more negative relative to its previous state. This principle also applies to any description wherein positive or negative pulses are mentioned or referred to as up or down, or raised or lowered.

For the sake of simplicity, details of the necessary driving rings, accumulators, and single and double latches have been eliminated. Generally, a single latch comprises a double inverter and cathode follower which responds to an input signal to raise the output of the cathode follower. The cathode follower in turn supplies the desired signal and has a feed-back leading to the input to maintain the cathode follower conducting. The latch is turned Off by interrupting the latch back signal. A double latch is similar to a single latch with the exception that a single inverter and cathode follower section provide a negative output in response to a positive input. The negative output of this section is applied to the second latch section to maintain the latter output positive. The latch is maintained by directing the positive output from the second section to the first section. A positive pulse directed to the second section drops or returns the first section to its original condition. One of the sides having the normally conducting inverter is considered the off side. A more detailed explanation is provided in the above Hamilton et al. application, and latch apparatus of the above type is shown and claimed in E. S. Hughes, Jr., Patent No. 2,628,309, issued February 10, 1953.

In FIGS. 1, and 2a through 2c, a series of single connecting lines are shown leading to and from the various blocks. It is to be understood that the major portion of these single lines actually embodies a plurality of lines and that single lines are shown as a means for simplifying the drawings. The heavy shaded lines represent the data transmission lines between the blocks, while the lighter shaded lines are primarily control lines for selectively directing the data from one location to another. In addition, where a single switch is shown in these lines, an array of switches would be utilized for selectively gating the data.

It is to be understood that various timing pulses, most of which are not shown, and additional switching and the like, not shown, would be required to transfer the data to and from the various components making up the calculator. However, these additional elements, if shown, would merely complicate both the description and drawings without aiding in the understanding of the invention. Therefore, for the sake of simplification, all elements not bearing directly to the improved indexing system have been eliminated.

Timing pulses and gates

Figure 1:
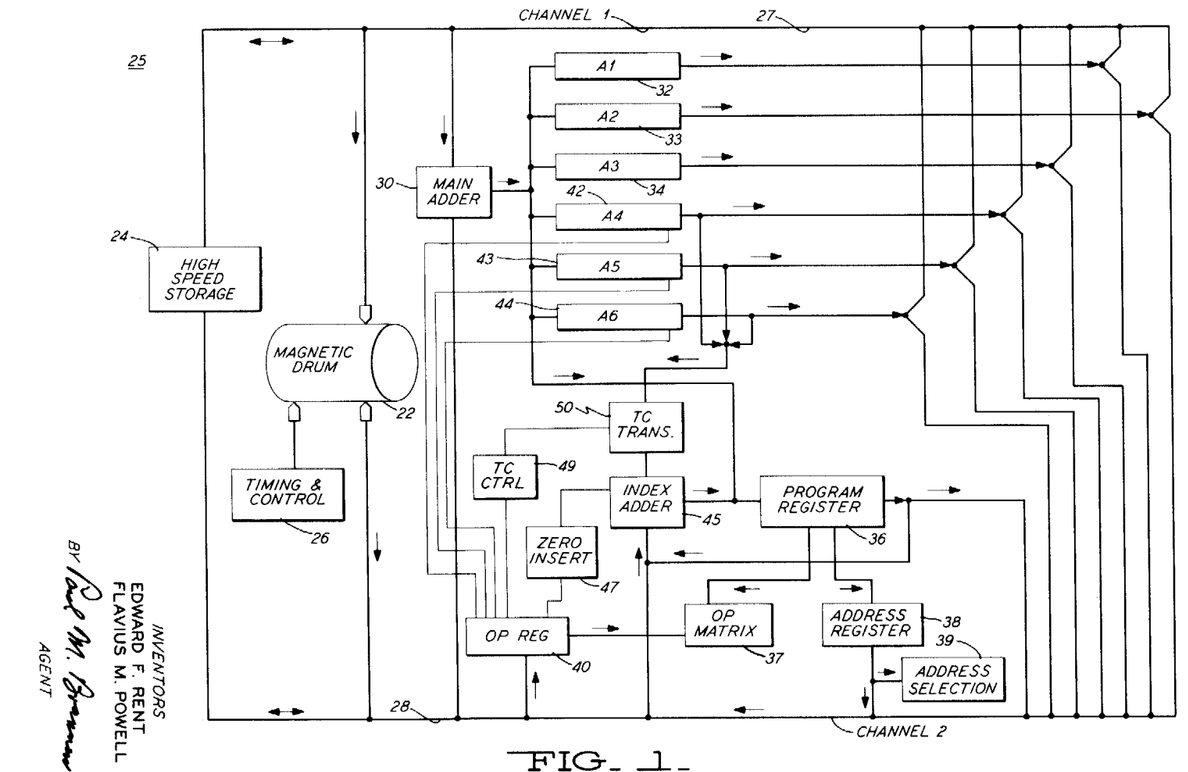
FIG. 1 is a simplified schematic block diagram of the pertinent portions of a fixed word length digital computer including the improved indexing system.

Information is recorded in high speed storage 24, FIG. 1, and drum storage 22, FIG. 1, by switching information gates with timing pulses to produce a specifically timed information pulse for energizing suitable driving rings or read/write heads, not shown. Information is read from high speed storage by switching a shaped read signal with a timing pulse to produce a specifically timed information pulse which can be used in turn on any suitable latch whose output will be an information gate similar in duration and timing to the one originally used in recording the spot or bit.

Timing pulses determine the position of a spot or bit when it is placed on the drum 22 or in high speed storage 24 and also insure that information read from the drum or high speed storage is available in the form of a properly timed information gate. In a similar way, other necessary drum timing divisions are established by timing pulses such that the exact position of the drum is known by the computing and control circuits at all times.

Figure 6:
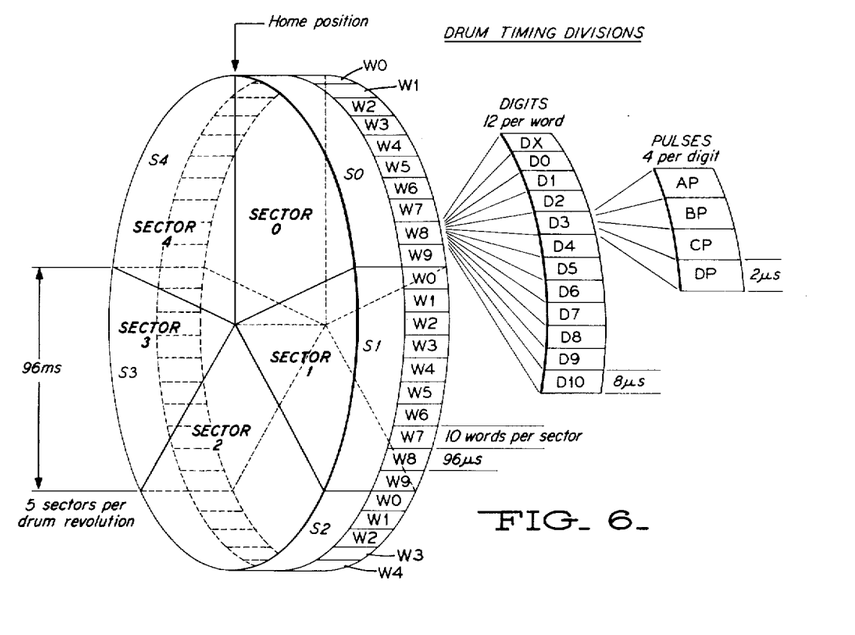
FIG. 6 illustrates the various divisions of a drum which relate to timing pulses.

FIG. 6 shows the principal drum timing divisions. All drum times are with relation to a "home" position which, in this instance, is the beginning of sector zero. Other drum divisions are sectors (five per revolution), words (fifty per drum revolution), digits (six hundred per revolution), and A, B, C and D pulses, one of each for each digit or six hundred of each per revolution.

The basic timing interval is an eight microsecond digit interval of which there are six hundred around the circumference of the drum. Each digit interval is divided into four equal pulse intervals, A, B, C and D. The beginning of a digit timing interval is marked by the leading edge of an A pulse. The B, C and D pulses of a digit follow at two microsecond intervals. Twelve digit intervals are included in a word interval. The twelve digits of each word are successively DX, D0, D1, D2, D3, D4, D5, D6, D7, D8, D9 and D10. Digit DX is used as a switching interval between successive words. Digit D0 is the sign storage time and digits D1–D10 represent the serial time space intervals of the storage of the first through tenth position digits of a ten-digit number. Ten word intervals are included in each sector, and five sectors make up the entire cycle of drum timing.

Just as the beginning of a digit interval is marked by its A pulse, pulses must be available to mark the beginning of each word, sector and home interval. These basic timing pulses may be obtained by reading permanently recorded spots on the drum's timing tracks.

The six basic timing tracks are (1) home pulse, (2) sector pulses, (3) word pulses, (4) B pulses, (5) D pulses, and (6) read sample pulses.

The other necessary timing pulses and gates may be obtained from single-shot multivibrator or latch circuits, not shown, actuated by these basic pulses and/or other manufactured pulses.

The following partial list defines terms used to describe timing pulses and gates and generally describes the pulses and gates used in this application:

Bit—smallest unit of information. A bit usually represents any one element of any combinational code which may be employed.

Digit (D)—elements of a code representing one decimal number, one of twelve intervals of a word. Bits representing a digit are present simultaneously within a time interval of eight microseconds.

Home (H)—a recorded spot on the drum which is a reference point for all timing signals.

Microsecond—one millionth of a second.

Word (W)—a combination of twelve digit intervals representing the smallest addressable storage unit of information. A word contains ten digits (D1–D10) representing numerical information plus one digit (D0) indicating sign, plus one digit (DX) allowed for switching interval between words.

Pulse (P)—basic timing signal usually about two microseconds' duration. Most pulses are obtained from permanently recorded signals on the drum which are amplified and shaped. Some pulses are generated from other pulses.

Gate—any signal not labeled pulse is assumed to be a gate and has no basic duration. Any created timing signal usually over two microseconds in duration which represents an exact timing signal between two pulses is defined as a gate. Gates are usually created by switching certain timing signals or by timed control of latch circuitry.

Negative pulses are signified with a prefix "N". Negative pulses are obtained by inverting normal pulses. A negative pulse, therefore, has a positive voltage level, except during the designated pulse time. For example: ND9—Negative D9 pulse.

Digit gates are initiated at A time but are considered ON only from B time of the designated digits to A time of the following digit.

DX—switching digit gate.

D0—sign digit gate.

Digits 1 through 10—digits designated for numerical information. Digit 1 represents units position, digit 10, high order position.

General description

Referring to FIG. 1, there is shown a general schematic diagram of the data processing machine or calculator 25 which includes a magnetic drum 22 or the like for storing a large quantity of data as magnetized spots on the surface thereof, and a high speed storage 24, such as a magnetic core matrix. Permanently recorded spots on the drum 22 govern timing and control circuits indicated schematically at 26, for governing the operation of the calculator by providing the timing pulses previously described. Data flow between the principal sections of the calculator takes place over first and second principal channels designated by the reference characters 27 and 28 respectively, and labeled on the drawing as channel 1 and channel 2.

The main arithmetic section includes a main adder 30 and three accumulators 32, 33 and 34 also designated as A1, A2 and A3, the inputs to the main adder being connected to channels 1 and 2 respectively, and the output from main adder 30 being selectively connectable to any one of the accumulators 32, 33 and 34. The outputs of these accumulators are connectable to channels 1 and 2 as indicated diagrammatically in FIG. 1, so that data extracted from storage may be processed through the main adder and the accumulators to provide the various arithmetic operations in the calculator and thereafter returned to the drum or core storage, for storage or for read-out to suitable output devices, which output devices form no part of the subject invention and hence are not illustrated.

In addition to the main arithmetic section, the program step or instruction words govern operation of the calculator through the medium of an OP register 40, and a program register 36 which is arranged to store one program step or instruction word and supplies this information to an OP matrix 37, and an address register 38, which in turn supplies control signals to suitable address selecting networks 39.

As previously pointed out, each of the program step or instruction words is an eleven digit word divided into three portions: a four digit data address or D address portion, D8—D5, for instructing the calculator where data to be processed is located in the storages 22 and 24 or other addressable locations; a three digit operation portion, D10–D9 and D0, called an OP code, for instructing the calculator as to the operation or process the calculator is to perform with the data found in the address portion; and a four digit instruction or I address portion, D4–D1, for instructing the calculator where the next program step word is located in the main storage.

The operation or OP code portion of the program step word is received in the OP register 40, from whence control signals may be supplied to the operation matrix 37 in addition to the information received from the program register 36, to provide suitable operation code instructions for the calculator.

After an address is selected and the data found at that address is operated upon by the calculator, the instruction portion of the program word is entered into the address register 38 from the program register 36 to replace the value previously in the address register. A new program step word located at the address in main storage corresponding to the instruction portion of the program step in the address register 38 is selected and transferred into the program register 36 to replace the value previously stored therein. Thus, large numbers of program values and large amounts of data may be stored on the magnetic drum 22 or in the high speed storage 24, and the sequence of the above outlined procedure may automatically continue for a large number of program steps. A storage sequence of such instruction words forms a program routine. The apparatus with which the present invention is particularly concerned, includes three indexing accumulators, A4, A5 and A6, designated by reference characters 42, 43 and 44 respectively, an index adder 45, a zero insertion control 47, true-complement control 49, true-complement translator 50, and the necessary control circuits therefor which will be described hereinafter. The indexing accumulators A4, A5 and A6 are essentially identical with the main accumulators A1, A2 and A3, and are connected to the output of the main adder 30 in the same manner. The outputs of these accumulators, however, are arranged so that by suitable selective switching the output information may be supplied through the true-complement translator 50 to one input of the index adder 45, the other input of which is selectively connected at times to channel 2. The output of index adder 45 is connected to the input of program register 36, so that the address portion of all instruction words supplied to program register 36 must pass through index adder 45. The index accumulators A4, A5 and A6, the true-complement control 49, and the zero insertion control 47 are all governed by switching circuits primarily governed by OP register 40, and the parts are arranged so that the digit value in the sign position of the OP code, as previously explained, provides a control for determining whether or not an indexing operation is to take place on an instruction word, and if so, to govern the type of indexing operation and the indexing accumulator which is to be involved in the operation.

Figure 7:
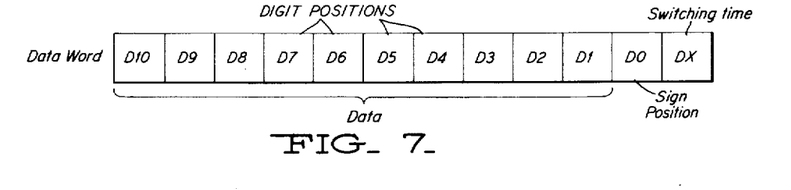
FIG. 7 represents a data word or operand including digit positions.
Figure 8:
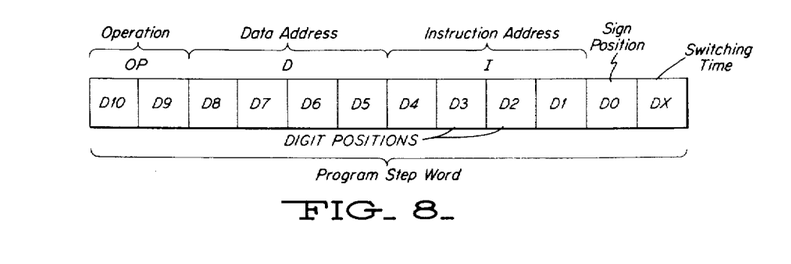
FIG. 8 represents a program step word, divided into its various components.

Since, as previously explained, the calculator is of the serial-by-digit type, the accumulators A1 through A6, the main adder 30 and the index adder 45 are of the serial type, that is, the accumulators may be of the type in which the information is entered one digit at a time at the left-hand end thereof and shifted through the accumulator until the capacity of the accumulator is reached. During readout, the digits of the word stored in the accumulator are shifted out one digit at a time from the outputs at the right-hand side thereof. The adders are of any well-known type which are arranged to add a single digit at a time, and to provide an output indicative of the sum or the difference of the inputs supplied thereto depending on the operation of the true-complement translator associated with the adder. Since such devices are well-known in the art, they are not illustrated in detail herein, but may be of the type shown in the afore-mentioned Hamilton et al. application. The calculator is provided to handle a plurality of digits D10–DX grouped to define a word of data as shown in FIG. 7, a word (W) of data or operand consisting of ten data digits and an algebraic sign. The words are stored serially on the drum 22 or in the high speed storage 24 and as shown in FIG. 6, the digits of a word are stored serially within each word interval. Any suitable combination code may be used to represent the digits, such as the two-out-of-five code or the biquinary code illustrated in the Hamilton et al. application.

The calculator can add, subtract, multiply or divide and make logical tests such as plus, minus and zero accumulator balance. All of these arithmetic and logical operations are built into the machine. They are activated by the operation code portion of the instruction word. The calculator will accumulate ten digit words, and the sign control on all operations is automatic.

The arithmetic operations of the calculator are designed to handle numbers in a serial fashion. Thus during calculations, the ten digit words are processed by the arithmetic units on a digit-by-digit basis with machine time progressions through the units digit to the highest digit in the word. The basic cyclical timings of the machine are therefore related to digit position rather than digit value. In the arithmetic portion of the machine, the value of a digit may be determined by simultaneous combinations of bit pulses on two of five parallel information lines, for example. Successive indications of the various combinations of two of the five lines during successive digit time intervals will indicate serially the decimal values of the digits of a word.

Although the main adder 30, the OP register 40, and the input to index adder 45 are all capable of receiving information from channel 2, suitable switching is provided so that the OP register and the index adder 45 are connected to channel 2 only during the half of the machine cycle in which instructions are supplied from the main storage, and the main adder 30 is connected to channel 2 only during the half cycle in which data is being supplied from main storage.

*Detailed description*

Considering now the details of the subject invention as illustrated by FIGS. 2a through 2c, and FIGS. 9, 10 and 11, one arrangement in accordance with a preferred embodiment of the invention is shown. The schematic illustration in these figures is essentially the same as that of FIG. 1, except that certain of the switches and mixes are shown which govern the flow of information to and from various parts of the calculator. To simplify the drawings and description, certain of the controls for the switches or AND gates are not shown. Moreover, it should be noted that certain features common to any calculator, such as input-output devices, detailed timing circuits and the like have not been shown since they are unnecessary for an understanding of the present invention.

Figure 9:
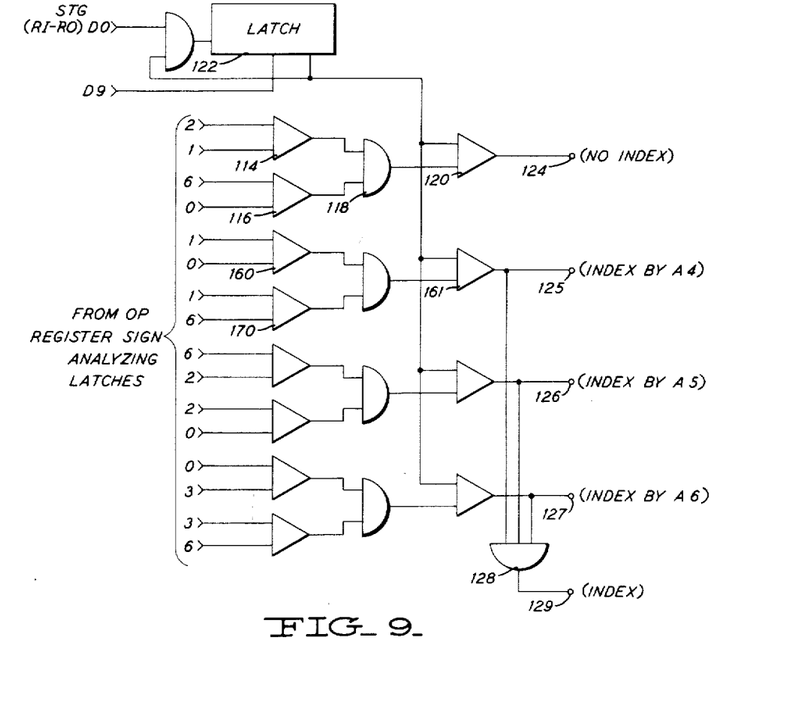
FIGS. 9, 10 and 11 illustrate certain of the detailed control circuits employed with the circuitry shown in FIGS. 2a to 2c.
Figure 10:
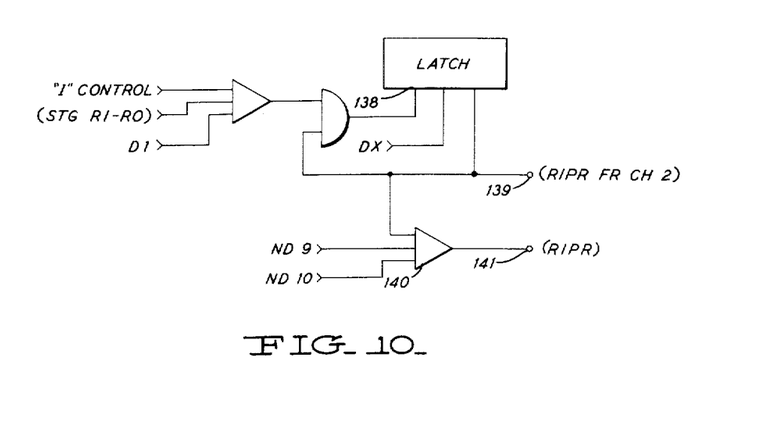

It is believed that the detailed description will be enhanced by describing the operation of the apparatus under several different operating conditions. As a first example, let it be assumed that a program step word is ready to be read out of the general or main storage, with no indexing operation to be called for, and with a plus sign value. Accordingly, the digit value in the sign position of the program step word will have a value of zero ("0"). During the I half cycle of the machine operation as indicated at 100 in FIG. 3, a signal 102, storage RI—RO, is provided to transfer the information from main storage to channel 2. This signal is immediately preceded by a signal 104, I to AR, which is supplied to terminal 106, FIG. 2b, to thereby transfer the address of the instruction word to the address register 38, which in turn controls the address selection circuits 39. The program step word at the selected address is accordingly read out digit by digit, starting with DX, D0 and so on to D10. During D0 time, as determined by the timing circuits 26, a D0 pulse is supplied to terminal 108 of switch 110, FIG. 2c, and since the I control signal is up at this time and supplied to terminal 112 of switch 110, the digital information present during D0 time of the present step word is supplied to the sign position of the OP register 40. The bit combinations are supplied to suitable latch circuits in the OP register, not shown, and the outputs of these switches are decoded by suitable logic circuits to indicate the value of the sign position digit. One such arrangement, employing a two-out-of-five code is illustrated in FIG. 9. As shown, the sign digit values are combined in switches in accordance with the operations which they control, i.e., 2 and 1 in the 2/5 code represent a decimal zero, and 6 and 0 in the 2/5 code represent a decimal 6. These 2/5 code signals are combined in switches 114 and 116 and then mixed in mix 118 and supplied to one input of a switch 120. The other input to switch 120 is supplied from the output of a latch 122 which is turned on at D0 time during Stg (RI—RO) time, and turned off at D9 time. Since the incoming program step word has a zero decimal value in the sign position, indicating a plus operation, no indexing, switches 114 and 120 are accordingly enabled, and a control signal is provided at terminal 124, No Index. In a similar fashion, which is obvious from the drawing, the other digit values in the sign position are decoded to provide the control signal Index by A4, Index by A5, and Index by A6, at terminals 125, 126 and 127, respectively. The signals at terminals 125, 126 and 127 are mixed in mix 128 to provide a control signal, Index, at terminal 129.

The No Index signal at terminal 124 governs the zero insertion circuit 47, FIG. 2c, so that zero digit values are supplied to one input 131 of index adder 45, by way of a mix 132. Details of the zero insertion circuit are not shown, since its exact form forms no part of this invention and since its form would differ in accordance with the particular code combinations employed to represent digits. Suffice it to say that the control signal No Index causes zeros to be added to any digit values supplied to index adder 45 at its second input line 133, so that the digit values at the output 134 are equal to the digit values entered over input line 133.

Figure 3:
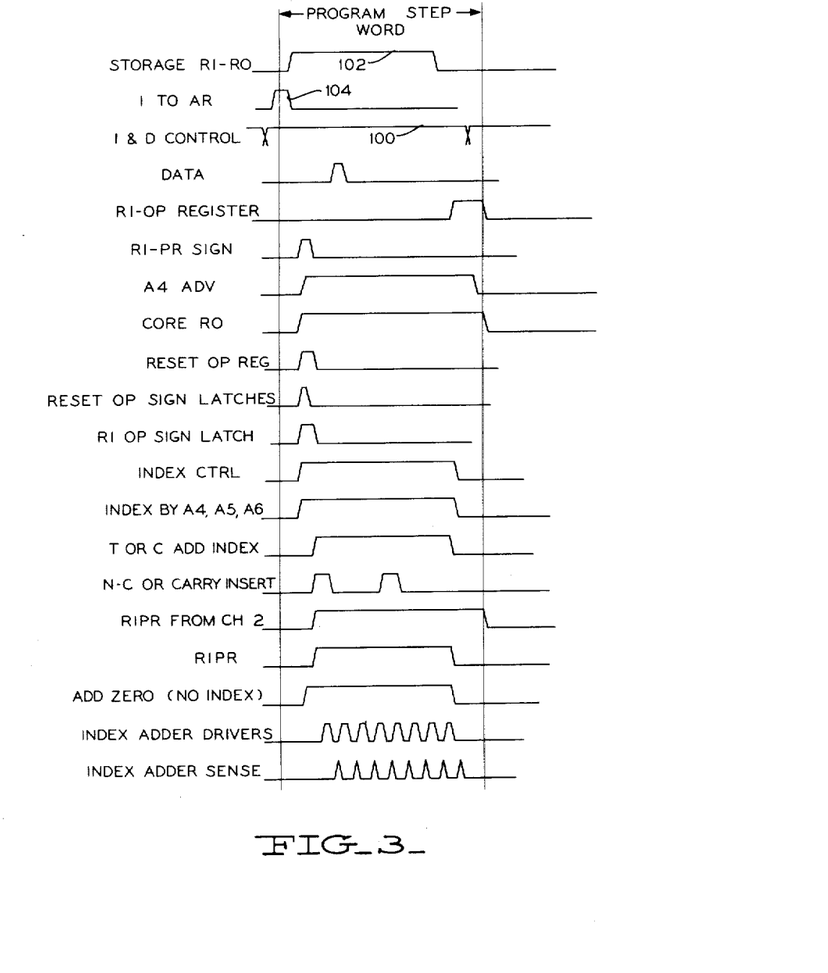
FIG. 3 is a graphic illustration of certain timing relations between various elements in the calculator.

As the machine cycle progresses, at D1 time a switch 136 is enabled by the control signal RIPR (Readin to program register). This signal is generated by the circuit shown in FIG. 10, comprising a latch 138 which is turned on by the coincidence of the "I" control signal, Stg RI—RO signal and D1 digit time signal, and is turned off at DX time of the following data word time. The output of latch 138 is supplied to a terminal 139 and is termed RIPR FR CH2 (Readin to Program Register from Channel 2). This signal is switched with negative D9 and D10 digit time signals, ND9 and ND10, in switch 140 and the resultant control signal RIPR is supplied at terminal 141. The time relation of these signals is shown in FIG. 3.

With RIPR supplied to switch 136, the information for positions D1 through D8, containing the data address and instruction address of the program step word is supplied over line 133 to the second input of index adder 45. Since, as previously described, appropriately timed zero digit values are being supplied to the other side of the adder, the digit values leaving the adder at output line 134 have the same value as those supplied over channel 2, reference character 28. Line 134 is mixed with other entrance channels to the program register in a mix 146, and the information is passed over line 147 to the program register 36. It is to be noted that no change has taken place in either the data address portion or the instruction address portion of the program step word.

At D9 and D10 times, switches 149 and 150 are enabled, so that the OP code portion of the program step word is passed from channel 2 to the D10–D9 sections of the OP register 40. The OP code digits along with the sign position digit are analyzed and supplied to suitable switching circuits in the operation matrix to provide operation controls for the calculator. By virtue of the selective timing of the operation of the switches 110, 136, 149 and 150, the various portions of the program step word are steered to their appropriate destinations.

With the new program step word in the program register, the system now proceeds to the data or D half cycle of machine operation, during which time the data address portion of the program step word is passed by gate 151 to the address register 38, and the address information governs the address selection controls 39 to locate and read out the desired data, which is then operated upon as dictated by the operation matrix.

At the beginning of the next I half cycle, gate 151 closes and gate 106 opens, and the cycle previously described is repeated for another program step word.

For the second operating condition, assume that the incoming program step word involves a plus operation, with the instruction address to be indexed by the contents of indexing accumulator A4, which bears a plus value.

The sign value of the contents of the various accumulators is indicated in FIGS. 2a and 2b as being separately stored in sign registers or latches associated with the accumulators, such as A4S, having three outputs indicated as +, —, and α and representing, plus, minus and alphabetic sign designations. For the purposes of indexing, an α sign is considered as plus. Accordingly, at this time, the A4(+) terminal is enabled to supply a signal for use in the indexing operation.

The readin of the program step word to the indexing system follows the same steps as described for the first condition, with the exceptions now to be described.

Since the operation now involves indexing by A4 and a plus operation, the program step word will now have the value 1 encoded in sign position D0. Thus during D0 time, the "1" and "0" inputs to a switch 160, FIG. 9, will both be up so that a switch 161 is enabled, and a control signal Index by A4 is present at terminal 125. Additionally, the mix 128 provides an Index signal at terminal 129.

The data address and instruction portions of incoming program step word is supplied to the input line 133 of index adder 45 in the same manner as previously described. Regarding the other input 131 to index adder 45, the operation now in progress requires that the contents of index accumulator A4 be supplied to input 131 in its true value, so that the output to the program register will represent the sum of the incoming value and the stored value.

At this time the signal at terminal 125, Index by A4 is supplied to one input of a switch 156, the other input being connected to the output of indexing accumulator A4. The information stored in A4 is accordingly supplied to one input of the mix 157 and therefrom to the input of the true-complement translator 50, from which it is supplied to the input 131 of index adder 45 through mix 132.

Figure 11:
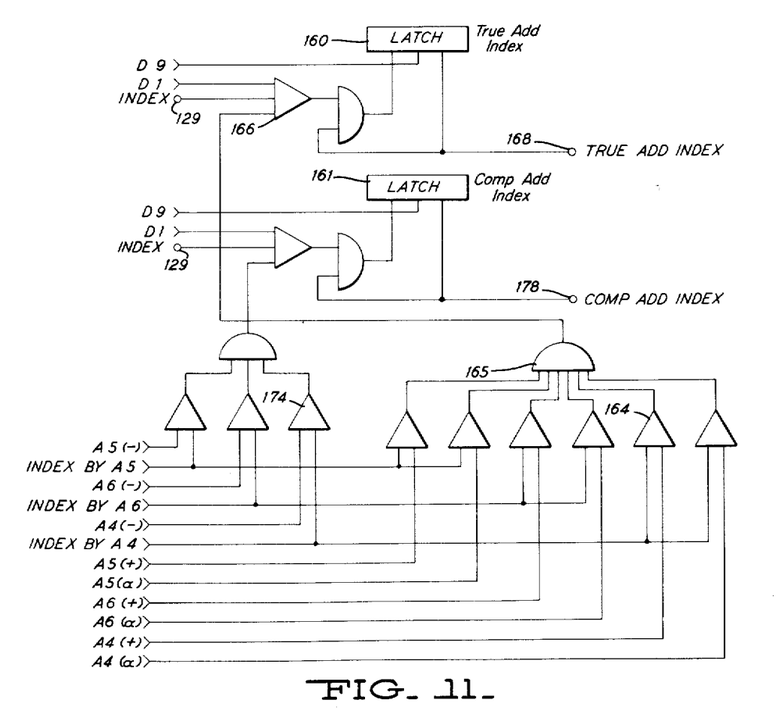

Since the present operation involves an addition of two positive numbers, the true-complement translator is controlled to supply the true values to mix 132. The true-complement control is derived by ascertaining the sign of the indexing accumulator and the incoming program step word by circuits such as shown in FIG. 11. As there illustrated, a pair of latches 160 and 161 are provided, designated as True Add Index and Comp Add Index. Both latches are controlled so that, if to be turned on, they turn on at D1 time, and are turned off at D9 time, each being governed also by the Index signal provided at terminal 129. Selection between the two latches is accomplished by the switches and mixes illustrated which combine the indexing accumulator sign values and the program step word sign values. For the subject example, the switch 164 has its two inputs, Index by A4 and A4(+) both up. The switch output passes through mix 165 to the latch input switch 166, so that latch 160, True Add Index is turned on at D1 time and stays on until D9 time, with the result that a control signal True Add Index is supplied at terminal 168 from D1 to D9 time. This signal governs the T—C translator 50 so that the true value of the contents of indexing accumulator A4 are supplied to index adder 45. The resultant data and/or instruction address, representing the sum of the program step word values and the accumulator A4 values, is supplied to the program register, following which the operation proceeds as described previously for the first operating condition.

As a third example of the operation of the indexing system, consider the condition where the sign of the program step word is plus, and the selected index accumulator is A4 with a minus sign for the contents thereof.

Under these conditions, the decimal value in the sign position of the program step word is one ("1") denoting "Plus operation, Index by A4." This operation now follows the same steps as recited above, except that the Comp Add Index latch 161 is turned on at D1 time, rather than True Add Latch 160. Turn-on of latch 161 results from the presence, at the input of a switch 174, of the signals Index by A4 and A4(−). The output of latch 161 is supplied to a terminal 178, Comp Add Index, from whence it is supplied to the true or complement translator 50, to cause the data supplied from index accumulator A4 to be complemented before entering the index adder 45. Addition of the complement of the contents of index accumulator A4 to the address portion of the program step word provides the difference therebetween at the output of the index adder, which information is then fed to the program register 36, and the cycle continues in the manner first described.

An illustrative set of examples of various indexing operations is set forth below:

| Digit Value in Sign Position | Actual OP Code | Instr. D-Addr. | I-Addr. | Contents of Index Acc. | Indexed Instruction | Remarks |
|---|---|---|---|---|---|---|
| 7 | 13 | 0136 | 2865 | 0001110000+ | −13 0247 2865 | Index D by Acc. 5. |
| 8 | 13 | 0136 | 2865 | 0000000025+ | −13 0136 2890 | Index I by Acc. 6. |
| 7 | 13 | 0100 | 3245 | 8802300055+ | −13 0330 3300 | Index D and I by Acc. 5. |
| 1 | 17 | 3000 | 3245 | 0040000000+ | +17 700 3245 | Address Error. |
| 1 | 17 | 3000 | 3245 | 0002000240− | +17 2800 3005 | Index D and I by Acc. 4. |
| 3 | 17 | 3024 | 2714 | 0098760312− | +17 3148 2402 | Index D and I by Acc. 6. |
| 1 | 27 | 3024 | 3245 | 0010240000− | +27 2000 3245 | Index D by Acc. 4. |
| 2 | 27 | 3007 | 3245 | 0000000040− | +27 3007 3205 | Index I by Acc. 5. |

Because the addition and subtraction operations involved in modifying the addresses in the program step word are carried out in a separate or independent arithmetic section including the index adder, the indexing operation is rendered independent of the main arithmetic section including the main adder. This results in faster operation since, if the main arithmetic section were employed for indexing, the indexing arithmetic operations would necessarily have to be sandwiched between data arithmetic operations, and indexing arithmetic would be forced to wait until data arithmetic was accomplished or vice versa.

As may be seen in the drawings, and as described briefly above, the indexing accumulators have their inputs and outputs connected to the main arithmetic section. Thus it is possible to perform arithmetic operations on the indexing data stored in the indexing accumulators, just as such operations are performed on problem data. This feature affords a higher degree of flexibility in setting up programs involving indexing operations. It should also be noted that one or more of the accumulators may be provided with a full complement of indexing digit control latches, so that in addition to indicating +, − and α signs, the sign registers may also indicate indexing operations by storing the digits 0 through 9 for the sign position of a program step word. In this manner, the accumulators may be used as a high speed storage of program step words including the indexing control digits.

From the foregoing, it is apparent that the present invention provides an improved indexing system for stored-program calculators, which system includes separate addressable indexing accumulators and an auxiliary arithmetic section for handling the arithmetic operations involved in indexing.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An indexing system for a stored-program calculator having a program register for receiving and storing a program step word having a plurality of digit positions bearing coded character representations and wherein certain of the said digit positions define an address for data, said program step word further including a sign position capable of bearing a selected one of a plurality of indexing control digits, said indexing control digits being divided into a first group indicating plus operations and a second group indicating minus operations, said system comprising at least one indexing accumulator for storing data thereat in like coded character representations, an accumulator sign register associated with said accumulator for storing a sign indication of the accumulator stored data, an auxiliary arithmetic section including an index adder, main storage means, means including said auxiliary arithmetic section for selectively connecting said program register to said main storage means through said index adder, to thereby supply said program step words to said program register, indexing control means governed by the values of said indexing control digits, true-complement translating means connected to said adder, means for governing said true-complement translating means in accordance with the group in which said indexing digits fall and in accordance with the indication of said accumulator sign register, and means governed by said indexing control means for connecting said accumulator to said true-complement translating means to selectively add the true or the complemented value of the data stored in said accumulator to said address portion of said program step word during delivery to said program register.

2. An indexing system for a stored-program calculator having a program register for receiving and storing a program step word having a plurality of digit positions bearing coded character representations and wherein certain of the said digit positions define an address for data, said program step word further including a sign position capable of bearing a selected one of a plurality of indexing control digits, said indexing control digits being divided into a first and a second group indicating plus and minus operations respectively, said system comprising a plurality of indexing accumulators, each having an input and an output selectively connectable to the main arithmetic section of said calculator, an accumulator sign register associated with each of said indexing accumulators for storing a sign indication of the accumulator stored data, an auxiliary arithmetic section including an index adder, main storage means, means including said auxiliary arithmetic section for selectively connecting said program register to said main storage means through said index adder, to thereby supply said program step words to said program register, indexing control means governed by the value of said indexing control digits, true-complement translating means connected to said adder, means for governing said true-complement translating means in accordance with the group in which said indexing digits fall and in accordance with the indication of said accumulator sign register, and means governed by said indexing control means for connecting said accumulator to said true-complement translating means to selectively add the true or the complement value of the data stored in said accumulator to said address portion of said program step word during delivery to said program register.

3. An indexing system for a stored-program calculator having a program register for receiving and storing a program step word having a plurality of digit positions bearing coded character representations and wherein certain of the said digit positions define an address for data, said program word also including operation code positions for designating the operations to be performed by the calculator, and a sign position capable of bearing a selected one of a plurality of indexing control digits, said indexing control digits being classified into at least two operations groups, said system comprising at least one indexing accumulator, an auxiliary arithmetic section, main storage means, means including said auxiliary arithmetic section for selectively connecting said program register to said main storage means to thereby supply said program step words to said program register, indexing control means governed by the value of said indexing control digits, an operation code register for receiving and storing the operation code portion and the sign position of each program step word, means governed by said operation code register for governing the operation of said calculator in accordance with the operations group of said indexing control digits and the value of the digits in the operations code portion of the program step word, and means governed by said indexing control means for selectively connecting said indexing accumulator to said auxiliary arithmetic section to selectively modify the address portion of said program step word during delivery to said program register.

4. An indexing system for a stored-program calculator having a program register for receiving and storing a program step word having a plurality of digit positions bearing coded character representations and wherein certain of the said digit positions define an address for data, said program word also including operation code positions for designating the operations to be performed by the calculator, and a sign position capable of bearing a selected one of a plurality of indexing control digits, said indexing control digits being classified into at least two operations groups, said system comprising a plurality of indexing accumulators, an auxiliary arithmetic section including an index adder, main storage means, means including said auxiliary arithmetic section for selectively connecting said program register to said main storage means to thereby supply said program step words to said program register via said index adder, indexing control means governed by the value of said indexing control digits, an operation matrix for governing the functions of said calculator, said operation matrix being governed in accordance with the operation code portion of said program step words and further governed in accordance with the grouping of the index digit in said program step word, and means governed by said indexing control means for selectively connecting said indexing accumulators to said index adder to modify the address portion of a program step word during delivery to said program register.

5. An indexing system for a stored program calculator as claimed in claim 4, further comprising means for storing the sign of data stored in said index accumulators, and means including said index adder for adding the true values or the complement values of the data stored in said indexing accumulators to the address portion of a program step word during delivery to said program register, in accordance with the sign stored for said data.

References Cited in the file of this patent

UNITED STATES PATENTS

| | | |
|---|---|---|
| 2,636,672 | Hamilton | Apr. 28, 1953 |
| 2,800,277 | Williams | July 23, 1957 |
| 2,914,248 | Ross et al. | Nov. 24, 1959 |
| 2,957,626 | Havens et al. | Oct. 25, 1960 |

FOREIGN PATENTS

| | | |
|---|---|---|
| 1,099,467 | France | Mar. 23, 1955 |